United States Patent
Snyder et al.

(10) Patent No.: US 10,978,891 B2
(45) Date of Patent: Apr. 13, 2021

(54) METHODS AND APPARATUS FOR EXTENDING DISCHARGE OVER-CURRENT TRIP TIME IN A BATTERY PROTECTION CIRCUIT

(71) Applicant: Motorola Solutions, Inc., Chicago, IL (US)

(72) Inventors: Robert L. Snyder, Suwanee, GA (US); Donald L. Flowers, Dacula, GA (US)

(73) Assignee: Motorola Solutions, Inc., Chicago, IL (US)

( * ) Notice: Subject to any disclaimer, the term of this patent is extended or adjusted under 35 U.S.C. 154(b) by 325 days.

(21) Appl. No.: 16/006,449

(22) Filed: Jun. 12, 2018

(65) Prior Publication Data

US 2019/0379219 A1 Dec. 12, 2019

(51) Int. Cl.
*H02J 7/00* (2006.01)

(52) U.S. Cl.
CPC .......... *H02J 7/0029* (2013.01); *H02J 7/0063* (2013.01); *H02J 7/00304* (2020.01)

(58) Field of Classification Search
CPC ...... H02J 7/0029; H02J 7/0031; H02J 7/0063; H02J 7/00304; H02J 7/00308; H02J 7/00309; H02H 3/04; H02H 3/06; H02H 3/28; H02H 3/247
USPC ..................... 361/87–89, 91.2, 91.3, 93.7, 94
See application file for complete search history.

(56) References Cited

U.S. PATENT DOCUMENTS

| | | | |
|---|---|---|---|
| 5,875,085 A * | 2/1999 | Farley | H01L 29/78 361/18 |
| 5,896,025 A * | 4/1999 | Yamaguchi | H02J 7/0031 320/134 |
| 5,936,384 A * | 8/1999 | Fujiwara | H02J 7/0031 320/112 |
| 6,316,915 B1 | 11/2001 | Fujiwara et al. | |

(Continued)

FOREIGN PATENT DOCUMENTS

EP 2194600 6/2010

OTHER PUBLICATIONS

International Search Report and Written Opinion for PCT Patent Application No. PCT/US2019/033292, dated Jul. 19, 2019; 13 pages.

(Continued)

*Primary Examiner* — Yemane Mehari
(74) *Attorney, Agent, or Firm* — Baker Botts L.L.P.

(57) ABSTRACT

Methods and apparatus for extending discharge over-current trip time in a battery protection circuit are disclosed. The protection circuit includes a safety circuit that asserts a first discharge over-current indicator when the discharge current of the battery exceeds a first discharge over-current threshold corresponding to a sustained over-current limit, a delay circuit that applies an added delay to the assertion of the first discharge over-current indicator, and a short circuit detection circuit that asserts a second discharge over-current indicator, with no delay added, when the discharge current exceeds a second discharge over-current threshold corresponding to a cell-specific peak output current limit. The battery protec- (Continued)

tion circuit includes a logic circuit configured to assert a discharge over-current control signal to disable the battery responsive to assertion of the first discharge over-current indicator or the second discharge over-current indicator.

17 Claims, 6 Drawing Sheets

(56) References Cited

U.S. PATENT DOCUMENTS

| | | | | |
|---|---|---|---|---|
| 6,903,533 B1* | 6/2005 | Geren | ............ | H02J 7/0031 320/134 |
| 7,541,972 B1* | 6/2009 | Dougherty | ............ | G01S 7/34 342/175 |
| 7,952,330 B2* | 5/2011 | Mori | ............ | H01M 2/34 320/150 |
| 2002/0079869 A1* | 6/2002 | Fujiwara | ............ | H02J 7/0031 320/157 |
| 2008/0048620 A1* | 2/2008 | Zhang | ............ | H01M 10/48 320/134 |
| 2008/0048621 A1* | 2/2008 | Yun | ............ | H02J 7/00036 320/136 |
| 2010/0117602 A1* | 5/2010 | Matsui | ............ | H02J 7/00308 320/152 |
| 2010/0141215 A1* | 6/2010 | Takeda | ............ | H02J 7/0029 320/136 |
| 2011/0169456 A1* | 7/2011 | Wang | ............ | H02J 7/0031 320/134 |
| 2012/0224289 A1* | 9/2012 | Peterson | ............ | H02J 7/0031 361/79 |
| 2013/0169038 A1* | 7/2013 | King | ............ | H02J 7/0031 307/10.1 |
| 2016/0372945 A1 | 12/2016 | Kageyama et al. | | |
| 2017/0141592 A1* | 5/2017 | Snyder | ............ | H02J 7/0031 |

OTHER PUBLICATIONS

Transmittal and International Preliminary Report on Patentability for International Application No. PCT/US2019/033292, dated Dec. 24, 2020, 9 pages.

* cited by examiner

US 10,978,891 B2

METHODS AND APPARATUS FOR EXTENDING DISCHARGE OVER-CURRENT TRIP TIME IN A BATTERY PROTECTION CIRCUIT

BACKGROUND OF THE INVENTION

Feature rich portable electronic devices, including portable communication devices, require ever increasing amounts of energy from batteries in terms of higher peak load currents and higher average load currents. For example, radios have evolved from simple analog devices with peak transmission power demands to multifunction computing systems in which different software-controlled modes have different peak current demands. When multiple radio functions or modes are enabled on a radio at the same time, this can lead to radio load current levels greater than the load current at which a battery protection circuit in the radio will trip and disable the battery. For example, the battery protection circuit may trip and disable the battery in response to brief spikes in the load current or in response to increases in the load current of a longer duration. The radio may be restricted in terms of power consumption or current consumption to satisfy compliance with one or more safety standards, including Appareils destinés à être utilisés en ATmosphères EXplosibles (ATEX), Underwriters Laboratories (UL), and International Electrotechnical Commission System for Certification to Standards Relating to Equipment for Use in Explosive Atmospheres (IECEx), or to avoid damaging the battery or the radio due to over-charge, over-discharge, or over-current conditions.

Designing batteries and battery protection circuits to meet standards such as the IEC 60950-1 requirements for limited power source (LPS) developed and published by the International Electrotechnical Commission, tends to limit power delivery. One requirement specifies that an output current exceeding 8 amps cannot be sustained for over five seconds. Another requirement specifies that the peak output power cannot ever exceed 100VA for over five seconds. For a battery with a maximum output voltage of 8.4 Volts, the peak output current limit corresponding to the 100VA peak output power limit would be 11.9 amps. The lower of the two limits apply. When these limits are exceeded, the battery must be disabled to prevent damage to the battery and to the load. Some portable devices can detect these conditions and take actions to reduce the output current below the specified limits, such as by disabling certain functions. However, these actions can take more time than is available given the relatively short discharge over-current trip delays in existing battery protection circuits.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1A:
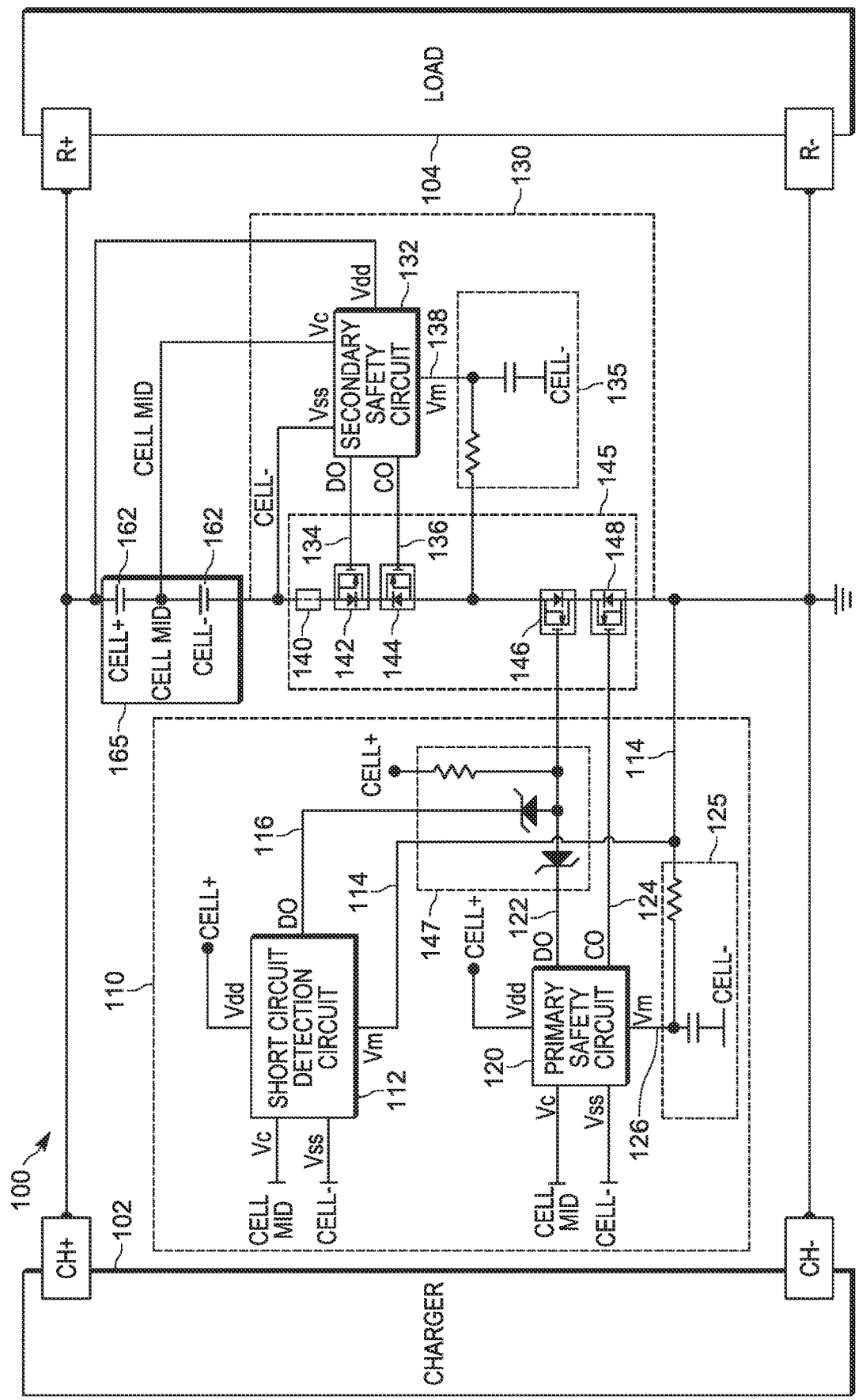
FIG. 1A is an illustration of selected elements of an example battery protection circuit that can be used to extend discharge over-current trip time, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for extending discharge over-current trip time in a battery protection circuit. In one embodiment, a disclosed protection circuit for a battery in an electronic device includes a discharge over-current trip circuit configured to disable the battery responsive to assertion of a discharge over-current control signal. The protection circuit also includes a primary safety circuit electrically connected to the battery and the discharge over-current trip circuit and configured to assert a first discharge over-current indicator output responsive to detecting that a discharge current of the battery exceeds a first discharge over-current threshold, and a primary delay circuit electrically connected to an over-current detection input of the primary safety circuit and configured to apply an added delay of a first delay amount to the assertion of the first discharge over-current indicator output. The protection circuit also includes a primary short circuit detection circuit electrically connected to the battery and the discharge over-current trip circuit and configured to assert a second discharge over-current indicator output responsive to detecting that a discharge current of the battery exceeds a second discharge over-current threshold. No added delay is applied to the assertion of the second discharge over-current indicator output. The protection circuit also includes a logic circuit electrically connected to the first discharge over-current indicator output and the second discharge over-current indicator output. The logic circuit is configured to assert the discharge over-current control signal responsive to one of: assertion of the first discharge over-current indicator output and assertion of the second discharge over-current indicator output.

In one embodiment, a disclosed method of providing battery protection in an electronic device includes electrically connecting a safety circuit to a battery and to a discharge over-current trip circuit, electrically connecting a delay circuit to an over-current detection input of the safety circuit, and electrically connecting a short circuit detection circuit to the battery and to the discharge over-current trip circuit. The method also includes asserting a discharge over-current control signal responsive to one of: assertion of a first discharge over-current indicator output by the safety circuit in response to detecting that the discharge current of the battery exceeds a first discharge over-current threshold and assertion of a second discharge over-current indicator output by the short circuit detection circuit in response to detecting that the discharge current of the battery exceeds a second discharge over-current threshold. The assertion of the first discharge over-current indicator output is delayed by application of an added delay of a first delay amount by the delay circuit. No added delay is applied to the assertion of the second discharge over-current indicator output. The method also includes disabling the battery responsive to the assertion of the discharge over-current control signal.

In one embodiment, a disclosed electronic device includes a battery, a discharge over-current trip circuit configured to disable the battery responsive to assertion of a discharge over-current control signal, a primary safety circuit electrically connected to the battery and the discharge over-current trip circuit and configured to assert a first discharge over-current indicator output responsive to detecting that a discharge current of the battery exceeds a first discharge over-current threshold, and a primary delay circuit electrically connected to an over-current detection input of the primary safety circuit and configured to apply an added delay of a first delay amount to the assertion of the first discharge over-current indicator output. The electronic device also includes a primary short circuit detection circuit electrically connected to the battery and the discharge over-current trip circuit and configured to assert a second discharge over-current indicator output responsive to detecting that a discharge current of the battery exceeds a second discharge over-current threshold. No added delay is applied to the assertion of the second discharge over-current indicator output. The electronic device also includes a logic circuit electrically connected to the first discharge over-current indicator output and the second discharge over-current indicator output. The logic circuit is configured to assert the discharge over-current control signal responsive to one of: assertion of the first discharge over-current indicator output and assertion of the second discharge over-current indicator output.

In at least some embodiments of the present disclosure, the methods and apparatus described herein for extending discharge over-current trip time in a battery protection circuit may use a hybrid battery protection architecture that maximizes power delivery while meeting published requirements for LPS. The battery protection circuit may include multiple battery protection circuit elements that are configured differently to provide protection in the case of long duration currents that are just above the battery discharge over-current trip limit of a battery safety circuit and in the case of short duration peak currents that far exceed the battery discharge over-current trip limit of the battery safety circuit, respectively. For example, a first discharge over-current threshold may be less than a predefined maximum current for a sustained over-current condition and a second discharge over-current threshold may be greater than the predefined maximum current for a sustained over-current condition and less than a predefined maximum current for a peak over-current condition.

In at least some embodiments, a delay circuit may be added to the over-current trip function of a battery safety circuit to allow high current pulses that are just above the battery discharge over-current trip limit to pass during a delay period without triggering the assertion of an LPS cutoff signal in the battery safety circuit. A separate circuit may be configured to detect short circuit type conditions in which peak currents far exceed the battery discharge over-current trip limit of the battery safety circuit and to assert the LPS cutoff signal without adding a delay. By varying the delay period on these two battery protection circuit elements, varying amounts of energy can be realized without unnecessarily triggering the LPS cutoff signal.

In at least some embodiments, the battery protection circuit may include a dual primary protection circuit with a delayed over-current trip time and a fast short circuit trip time and a secondary protection circuit with a delayed over-current trip time. In some embodiments, the battery protection circuit may also include a secondary short circuit detection circuit with a fast short circuit trip time.

Referring now to FIG. 1A, there is provided a circuit diagram of one embodiment of a battery protection circuit 100 that can be used to extend discharge over-current trip time. In the illustrated example, the battery protection circuit 100 includes a charger 102, a load 104, a rechargeable battery 165, a primary battery protection sub-circuit 110, a discharge over-current trip circuit 145, and a secondary battery protection sub-circuit 130. As illustrated in this example, discharge over-current trip circuit 145 may include a sense resistor 140 and multiple control switches, shown as control switches 142, 144, 146, and 148. In operation, discharge over-current trip circuit 145 may be configured to disable rechargeable battery 165 responsive to the assertion of a discharge over-current control signal, as described in more detail below. Primary battery protection sub-circuit 110 includes a primary safety circuit 120 and a primary delay circuit 125 coupled to the discharge over-current detection input of primary safety circuit 120. As described in more detail below, the primary delay circuit 125 introduces a delay in the monitored discharge current signal 114 and outputs a delayed discharge current signal 126 to be provided at the discharge over-current detection input of primary safety circuit 120. In the illustrated embodiment, the primary delay circuit 125 includes a resistor-capacitor (RC) circuit. In one example, the RC circuit may include a 20 kΩ resistor and a 2.2 µF capacitor. In other embodiments, the primary delay circuit 125 may include an RC circuit comprising a resistor and/or a capacitor having different values. In some embodiments, the amount of the delay introduced by the primary delay circuit 125 is dependent on the discharge current of battery 165 and on the values of the resistor and capacitor components included in the RC circuit. In other embodiments, the primary delay circuit 125 may be implemented using other types of circuitry or logic, which may include circuitry or logic controlled by software. In one embodiment, the amount of the delay introduced by the primary delay circuit 125 may be dependent on a software-generated delay control signal provided to battery protection circuit 100 or to primary safety circuit 120.

The battery 165 includes battery cells 162. In the illustrated example, a positive terminal CH+ of the charger 102 is connected to a positive terminal Cell+ of the battery 165 and a positive terminal R+ of the load 104. Similarly, a negative terminal CH− of the charger 102 is connected to a negative terminal Cell− of the battery 165 and a negative terminal R− of the load 104. The path between the terminals (CH+ and CH−) of the charger 102 and the terminals (Cell+ and Cell−) of the battery 165 defines a charge path of the battery protection circuit 100. The charger 102 charges the battery 165.

In one embodiment, the battery protection circuit 100 is provided in a housing of an electronic device and the charger 102 is external to the housing of the electronic device. The positive terminal CH+ and the negative terminal CH− of the charger 102 are electrically connected to the battery protection circuit 100 when the charger is plugged into the electronic device. In other embodiments, the charger 102 may be located in the housing of the electronic device. In still other embodiments, the battery 165 and the battery protection circuit 100 are located outside the housing of the electronic device such as in a separate housing.

The battery 165 provides electrical power for operation of the load 104. For example, the load 104 may include circuit components of an electronic device, such as a microprocessor, memories, amplifiers, communication circuits and the like. The electronic device may be a multifunction radio, a mobile telephone, a laptop computer, a tablet computer, a smart phone, a lighting system, a sound system, or another type of portable electronic device, in different embodiments. The positive terminal Cell+ of the battery 165 is connected to the positive terminal R+ of the load 104 and the negative terminal Cell− of the battery 165 is connected to the negative terminal R− of the load 104. The path between the terminals (Cell+ and Cell−) of the battery 165 and the terminals (R+ and R−) of the load 104 defines a load path of the battery protection circuit 100. In certain embodiments, the load 104 also receives electrical power from the charger 102 when the battery 165 is charging.

The primary safety circuit 120 monitors electrical parameters of the battery 165. For example, the primary safety circuit 120 monitors, among other things, a voltage across the battery 165 and a current flowing through the battery 165. In the illustrated example, the primary safety circuit 120 is connected to the positive terminal Cell+, the negative terminal Cell−, and a middle terminal Cell Mid of the battery 165. In the illustrated example, the sense resistor 140 is connected in series with the battery 165. The primary safety circuit 120 uses the sense resistor 140 to monitor the current and voltage conditions of the battery 165.

In certain embodiments, the battery protection circuit 100 is provided, within secondary battery protection sub-circuit 130, with a secondary safety circuit 132 and a corresponding secondary delay circuit 135 coupled to the discharge over-current detection input of secondary safety circuit 132. The secondary safety circuit 132 is a redundant circuit that performs the same functions as the primary safety circuit 120 and may serve as a backup safety circuit when and if the primary safety circuit 120 fails. The secondary delay circuit 135 introduces a delay in the monitored discharge current signal 114 and outputs a delayed discharge current signal 138 to be provided at the discharge over-current detection input of secondary safety circuit 132. In the illustrated embodiment, the secondary delay circuit 135 includes an RC circuit. In one example, the RC circuit may include a 20 kΩ resistor and a 2.2 μF capacitor. In other embodiments, the secondary delay circuit 135 may include an RC circuit comprising a resistor and/or a capacitor having different values. In some embodiments, the amount of the delay introduced by the secondary delay circuit 135 is dependent on the discharge current of battery 165 and on the values of the resistor and capacitor components included in the RC circuit within secondary delay circuit 135. In other embodiments, the secondary delay circuit 135 may be implemented using other types of circuitry or logic, which may include circuitry or logic controlled by software. In one embodiment, the amount of the delay introduced by the secondary delay circuit 135 may be dependent on a software-generated delay control signal provided to battery protection circuit 100 or to secondary delay circuit 135.

In operation, when the primary safety circuit 120 detects that the battery 165 is in an over-current condition that occurs when the current provided by the charger 102 exceeds a predetermined threshold or an over-voltage condition that occurs when the voltage across the battery 165 exceeds a predetermined threshold, the primary safety circuit 120 may drive a control signal Co (124) to control switch 148. The control signal Co (124) may take one of two logic states: a HIGH state and a LOW state. During normal operation, when no over-voltage or over-current is detected, the control signal is HIGH and control switch 148 is closed. The primary safety circuit 120 drives the control signal Co LOW upon detecting an over-current, an over-voltage, or an over-charged condition, as described above, opening control switch 148 and disabling battery 165. Similarly, when the secondary safety circuit 132 detects that the battery 165 is in an over-current condition that occurs when the current provided by the charger 102 exceeds a predetermined threshold or an over-voltage condition that occurs when the voltage across the battery 165 exceeds a predetermined threshold, the secondary safety circuit 132 may drive a control signal Co (136) to control switch 144.

In operation, the primary safety circuit 120 monitors the discharge current of battery 165 and is operable to detect when the discharge current of battery 165 exceeds either of two discharge over-current thresholds that are set in accordance with LPS requirements. In one example embodiment, a first discharge over-current threshold may be set to a value that is less than the 8 amp limit for an output current that is sustained for 5 seconds or longer. In this example, a second discharge over-current threshold may be set to a value that is greater than the 8 amp limit on sustained output current and is less than the limit on peak output current for a given battery cell.

When the primary safety circuit 120 detects that the discharge current of battery 165 exceeds the first discharge over-current threshold, the primary safety circuit 120 may drive a discharge over-current control signal Do (122) to control switch 146. This discharge over-current condition occurs when load 120 draws an amount of current that exceeds the first discharge over-current threshold. The control signal Do (122) may take one of two logic states: a HIGH state and a LOW state. During normal operation, when no discharge over-current condition is detected, the control signal is HIGH and the control switch 146 is closed. The primary safety circuit 120 drives the control signal Do (122) LOW upon detecting a discharge over-current condition, as described above, opening control switch 146 and disabling battery 165. Similarly, when the secondary safety circuit 132 detects that the discharge current of battery 165 exceeds the first discharge over-current threshold, the secondary safety circuit 132 may drive a discharge over-current control signal Do (134) to control switch 142.

In addition, when the primary safety circuit 120 detects that the discharge current of battery 165 exceeds the second discharge over-current threshold, the primary safety circuit 120 may drive the discharge over-current control signal Do (122) to control switch 146. This discharge over-current condition may indicate a short circuit type condition in which the discharge current spikes well beyond the cell-specific limit on peak output current. The primary safety circuit 120 drives the control signal Do (122) LOW upon detecting a short circuit type condition, opening control switch 146 and disabling battery 165. Similarly, when the secondary safety circuit 132 detects that the discharge current of battery 165 exceeds the second discharge over-current threshold, the secondary safety circuit 120 may drive the discharge over-current control signal Do (134) to control switch 142.

In some embodiments, the primary safety circuit 125 and the secondary safety circuit 135 may be implemented, for example, using available integrated circuits, such as the S-8252 battery protection integrated circuit available from Seiko Instruments Inc. The battery protection integrated circuit may include a discharge over-current protection function and a fast short circuit protection function. The battery protection integrated circuit may be operable to assert a discharge over-current control signal in response to detecting a discharge over-current condition based on the voltage at a discharge over-current detection input after a fixed discharge over-current trip delay designed into the battery protection integrated circuit. The battery protection integrated circuit may also be operable to assert the discharge over-current control signal in response to detecting a short circuit condition based on the voltage at the discharge over-current detection input after a fixed short circuit trip delay designed into the battery protection integrated circuit.

By coupling the primary delay circuit 125 to the discharge over-current detection input of the primary safety circuit 120 and introducing a delay in the monitored discharge current signal 114 provided at the discharge over-current detection input of the primary safety circuit 120, the discharge over-current trip time of battery protection circuit 100 may be extended beyond the fixed discharge over-current trip delay designed into the primary safety circuit 120. Thus, battery protection circuit 100 may provide extra margin for responding to discharge over-current conditions. In some embodiments, battery protection circuit 100 may output a digital signal indicating the measured value of the monitored discharge current signal 114, the voltage measured at the discharge over-current detection input of the primary safety circuit 120, or another current or voltage measurement taken within battery protection circuit 100 indicating that a discharge over-current or short circuit condition might cause the battery 165 to be disabled in the near future. This digital signal may be provided to a host processor of load 104, in response to which the host processor may begin taking actions to reduce the discharge current in an attempt to avoid the disabling of the battery 165 or to reduce its impact. For example, the additional delay provided by battery protection circuit 100 may allow additional time for load 104, which may be a multifunction radio, a mobile telephone, a laptop computer, a tablet computer, a smart phone, a lighting system, a sound system, or another type of portable electronic device, to cleanly shut down, throttle, or disable certain functionality to reduce the discharge current of the battery 165 before the battery protection circuit 100 trips and disables the battery 165. This approach may eliminate the need to disable the battery in response to a discharge over-current condition when actions taken by the load 104 are successful in reducing the discharge current below the LPS limit before the extended discharge over-current trip time expires.

Adding a delay in the monitored discharge current signal 114 provided at the discharge over-current detection input of the primary safety circuit 120 to extend trip time in a sustained discharge over-current condition in which the discharge current exceeds the first discharge over-current threshold but does not exceed the second discharge over-current threshold, may defeat the fast short circuit protection provided by the primary safety circuit 120. In other words, because the added delay is applied to the discharge over-current detection input to primary safety circuit 120, it delays the detection of high discharge currents in sustained over-current situations and also when a short circuit type condition causes a large spike in the peak discharge current. Therefore, the ability of the primary safety circuit 120 to quickly remove a short circuit load is defeated. As illustrated in FIG. 1A, battery protection circuit 100 includes, within primary battery protection sub-circuit 110, a separate short circuit detection circuit 112 to protect the battery and the load 104 in the case of short circuit type conditions.

In operation, short circuit detection circuit 112 monitors the discharge current of battery 165 and is operable to detect when the discharge current of battery 165 exceeds the second discharge over-current threshold described above. When the short circuit detection circuit 112 detects that the discharge current of battery 165 exceeds the second discharge over-current threshold, the short circuit detection circuit 112 may drive the discharge over-current control signal Do (116) to control switch 146. This discharge over-current condition may indicate a short circuit type condition in which the discharge current spikes well beyond the cell-specific limit on peak output current. The short circuit detection circuit 112 drives the control signal Do (116) LOW upon detecting a short circuit type condition, opening control switch 146 and disabling battery 165. As shown in FIG. 1A, primary battery protection sub-circuit 110 includes a logic circuit 147 electrically connected to discharge over-current indicator output 122 and discharge over-current indicator output 116. Logic circuit 147 is configured to assert a discharge over-current control signal to control switch 146 responsive to one of: assertion of discharge over-current indicator output 122 and assertion of discharge over-current indicator output 116.

In some embodiments, the short circuit detection circuit 112 may also be implemented, for example, using a separate instance of the S-8252 battery protection integrated circuit described above. In this case, only the short circuit protection function may be enabled in the instance of the battery protection integrated circuit used to implement short circuit detection circuit 112. As illustrated in FIG. 1A, the battery protection circuit 100 does not incorporate the use of a delay circuit with the short circuit detection circuit 112. Therefore, the short circuit detection circuit 112 can quickly detect a short circuit type condition and disable the battery 165 without any added delay.

Figure 1B:
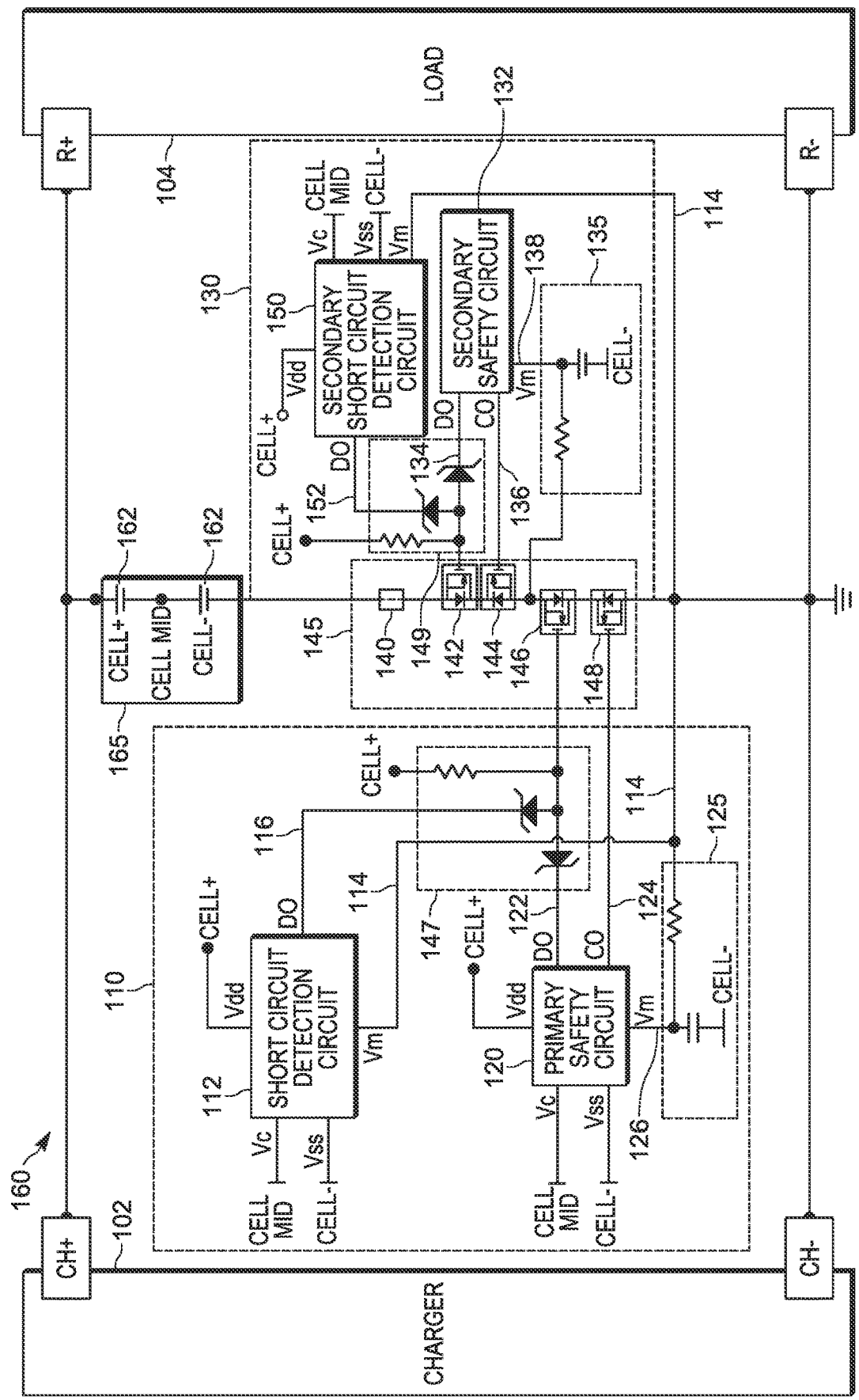
FIG. 1B is an illustration of selected elements of an example battery protection circuit that can be used to extend discharge over-current trip time and that includes a redundant short circuit detection circuit, in accordance with some embodiments.

In some embodiments, a battery protection circuit configured to extend discharge over-current trip time may also include a redundant short circuit detection circuit. FIG. 1B provides a circuit diagram of one embodiment of a battery protection circuit 160 that can be used to extend discharge over-current trip time and that includes a redundant short circuit detection circuit. As illustrated in FIG. 1B, battery protection circuit 160 includes all of the elements of battery protection circuit 100 illustrated in FIG. 1A. In addition, battery protection circuit 160 includes, within secondary battery protection sub-circuit 130, a secondary short circuit detection circuit 150.

In operation, secondary short circuit detection circuit 150 monitors the discharge current of battery 165 and is operable to detect when the discharge current of battery 165 exceeds the second discharge over-current threshold described above. When the secondary short circuit detection circuit 150 detects that the discharge current of battery 165 exceeds the second discharge over-current threshold, the secondary short circuit detection circuit 150 may drive the discharge over-current control signal Do (152) to control switch 142. This discharge over-current condition may indicate a short circuit type condition in which the discharge current spikes well beyond the cell-specific limit on peak output current. The short circuit detection circuit 112 drives the control signal Do (152) LOW upon detecting a short circuit type condition, opening switch 142 and disabling battery 165. As shown in FIG. 1B, secondary battery protection sub-circuit 130 includes a logic circuit 149 electrically connected to discharge over-current indicator output 134 and configured to assert a discharge over-current control signal to control switch 142 responsive to assertion of discharge over-current indicator output 134. Logic circuit 149 is also electrically connected to discharge over-current indicator output 152 and is further configured to assert a discharge over-current control signal to control switch 142 responsive to assertion of discharge over-current indicator output 152.

Figure 2:
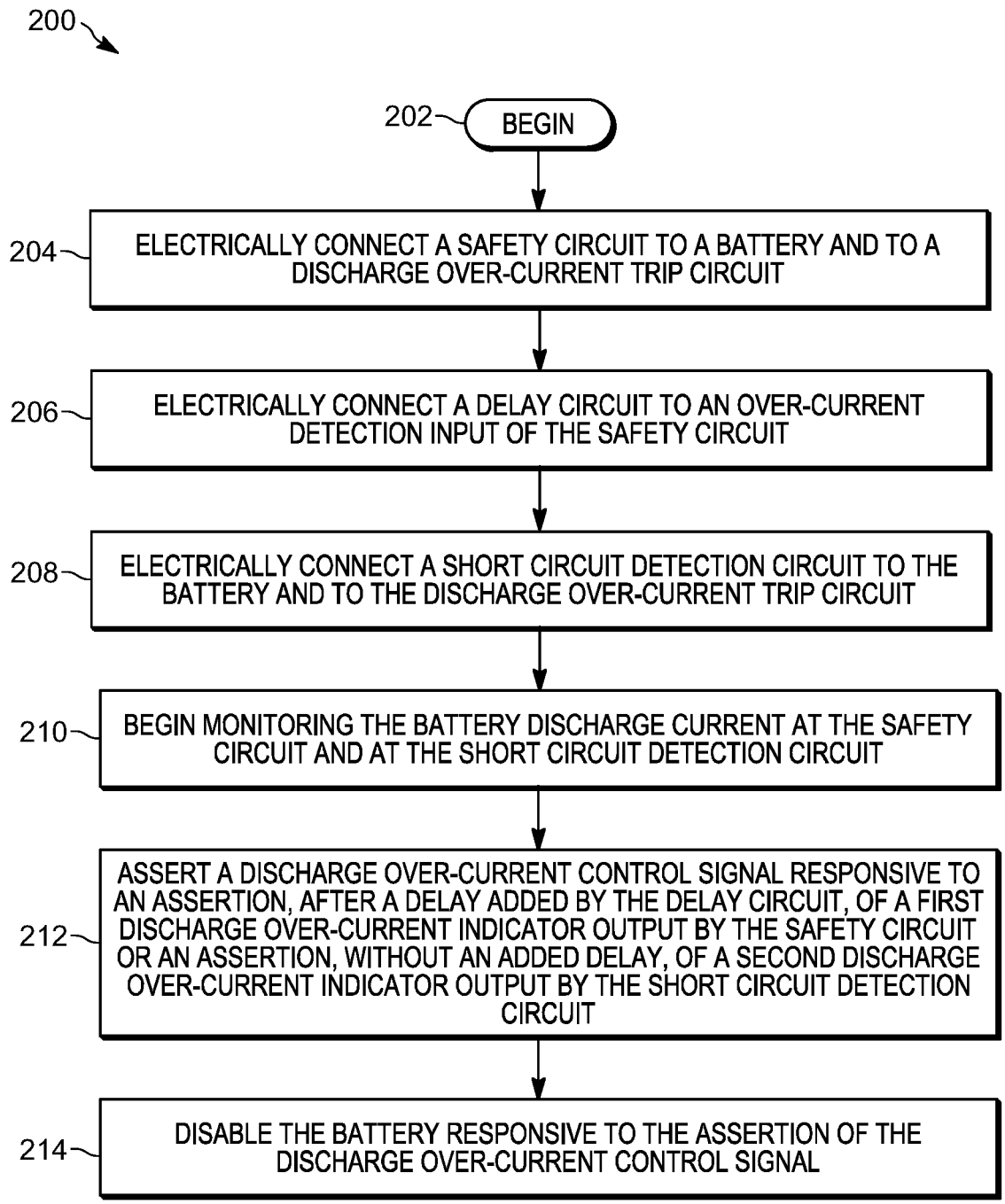
FIG. 2 is a flowchart illustrating selected elements of an example method for extending discharge over-current trip time in a battery protection circuit, in accordance with some embodiments.

Referring now to FIG. 2, there is provided a flow diagram of an example method 200 for extending discharge over-current trip time in a battery protection circuit, in accordance with some embodiments. While a particular order of operations is indicated in FIG. 2 for illustrative purposes, the timing and ordering of such operations may vary where appropriate without negating the purpose and advantages of the examples set forth in detail throughout the remainder of this disclosure.

In this example embodiment, method 200 begins with block 202 in FIG. 2 and continues with block 204, where a safety circuit is electrically connected to a battery and to a discharge over-current trip circuit. In some embodiments, the safety circuit may be a primary safety circuit in a battery protection circuit that also includes a secondary safety circuit. The safety circuit may be configured to monitor the discharge current of the battery and assert a first discharge over-current indicator output when the battery discharge current exceeds a first over-current threshold amount. In some embodiments, the first over-current threshold amount may be 8 amps, corresponding to the LPS requirement specifying that an output current exceeding 8 amps cannot be sustained for five seconds.

At block 206, a delay circuit is electrically connected to an over-current detection input of the safety circuit. The delay circuit may be configured to apply an added delay to the assertion of the first discharge over-current indicator output by the safety circuit. In some embodiments, the delay circuit may be an RC delay circuit, and the amount of the added delay may be dependent on the respective values of the resistor and capacitor in the RC delay circuit. In some embodiments, the amount of the added delay may be controlled by software. For example, the amount of the added delay may be dependent on a software-generated delay control signal provided to the battery protection circuit or, more specifically, to the safety circuit. Applying the added delay, thus extending the discharge over-current trip time of the battery protection circuit, may allow an electronic device powered by the battery to have enough time to disable functionality or take other action to reduce the discharge current of the battery before the battery protection circuit disables the battery.

At block 208, a short circuit detection circuit is electrically connected to the battery and to the discharge over-current trip circuit. The short circuit detection circuit may be configured to monitor the discharge current of the battery and assert a second discharge over-current indicator output when the battery discharge current exceeds a second over-current threshold amount. In some embodiments, the second over-current threshold amount may correspond to the cell-specific peak output current limit requirement specifying a current that cannot be exceeded for more than a short period of time. There may be no added delay applied to the assertion of the second discharge over-current indicator output. Therefore, in the case of a short circuit type condition, the battery protection circuit may be able to quickly detect the short circuit type condition and disable the battery.

At block 210, the safety circuit and the short circuit detection circuit begin monitoring the battery discharge current, as described above.

At block 212, a discharge over-current control signal is asserted by a discharge over-current trip circuit responsive to an assertion, after a delay added by the delay circuit, of a first discharge over-current indicator output by the safety circuit or an assertion, without an added delay, of a second discharge over-current indicator output by the short circuit detection circuit. Examples of the detection of different over-current conditions and the respective responses of the battery protection circuit are illustrated in FIG. 3 and described below.

At block 214, responsive to the assertion of the discharge over-current control signal, the battery is disabled.

As illustrated in FIGS. 1A and 1B, in some embodiments, the battery protection circuit may include a second safety circuit configured to monitor the discharge current of the battery and assert a third discharge over-current indicator output when the battery discharge current exceeds the first over-current threshold amount, and a second delay circuit configured to apply a delay to the assertion of the third discharge over-current indicator output. As illustrated in FIG. 1B, in some embodiments, the battery protection circuit may also include a second short circuit detection circuit configured to monitor the discharge current of the battery and to assert a fourth discharge over-current indicator output when the battery discharge current exceeds the first over-current threshold amount. The battery protection circuit may be configured to assert the discharge over-current control signal in response to assertion of any of the discharge over-current indicator outputs described above, with or without added delays.

Figure 3:
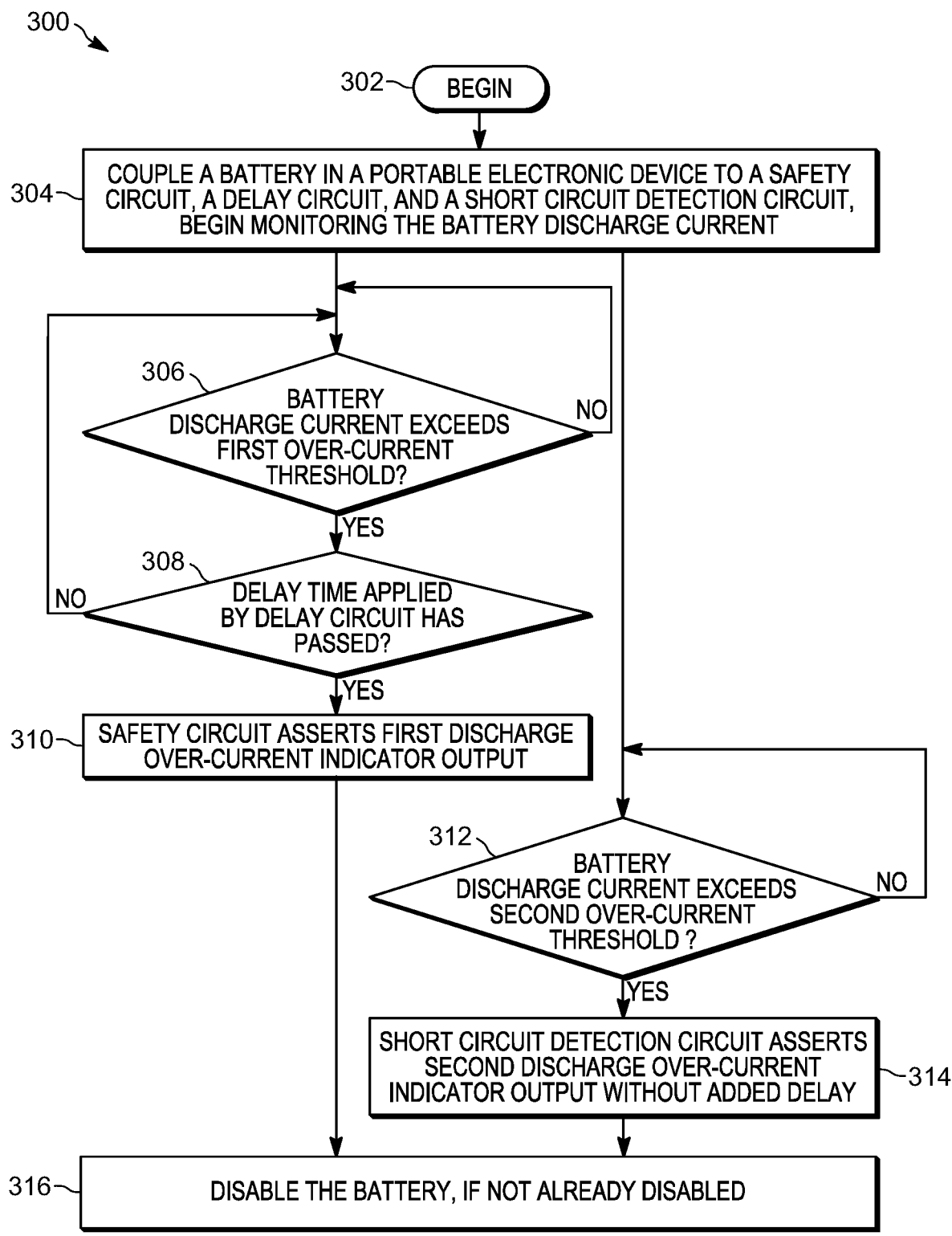
FIG. 3 is a flowchart illustrating selected elements of an example method for detecting and responding to different over-current conditions by a battery protection circuit, in accordance with some embodiments.

Referring now to FIG. 3, there is provided a flow diagram of an example method 300 for detecting and responding to different over-current conditions by a battery protection circuit, in accordance with some embodiments. While a particular order of operations is indicated in FIG. 3 for illustrative purposes, the timing and ordering of such operations may vary where appropriate without negating the purpose and advantages of the examples set forth in detail throughout the remainder of this disclosure.

In the example embodiment illustrated in FIG. 3, method 300 begins with block 302 and continues with block 304, where a battery in a portable electronic device is coupled to a safety circuit, a delay circuit, and a short circuit detection circuit, after which the safety circuit and the short circuit detection circuit begin monitoring the battery discharge current.

If, at block 306, it is determined that the battery discharge current exceeds a first over-current threshold, method 300 may continue at 308. Otherwise, the method may include repeating the operation shown at block 306 while the battery discharge current remains at or below the first over-current threshold.

If, at block 308, it is determined that the delay time applied by a delay circuit coupled to an over-current detection input of the safety circuit has passed, the method may proceed to 310. Otherwise, the method may include repeating the operations shown at blocks 306 and 308, as appropriate, while the battery discharge current remains at or below the first over-current threshold and until the delay time applied by the delay circuit has passed. At block 310, the safety circuit asserts the first discharge over-current indicator output.

If, at block 312, the battery discharge current exceeds a second over-current threshold, method 300 may proceed to 314. Otherwise, the method may include repeating the operation shown at block 312 while the battery discharge current remains at or below the second over-current threshold. At block 314, the short circuit detection circuit asserts a second discharge over-current indicator output without any added delay. At block 316, in response to the assertion of the first discharge over-current indicator output or the second discharge over-current indicator output, the method may include disabling the battery, if it has not already been disabled.

The operations shown in blocks 306 through 310 may be performed substantially in parallel with the operations shown in blocks 312 through 314 until and unless the first discharge over-current indicator output or the second discharge over-current indicator output is asserted.

Figure 4:
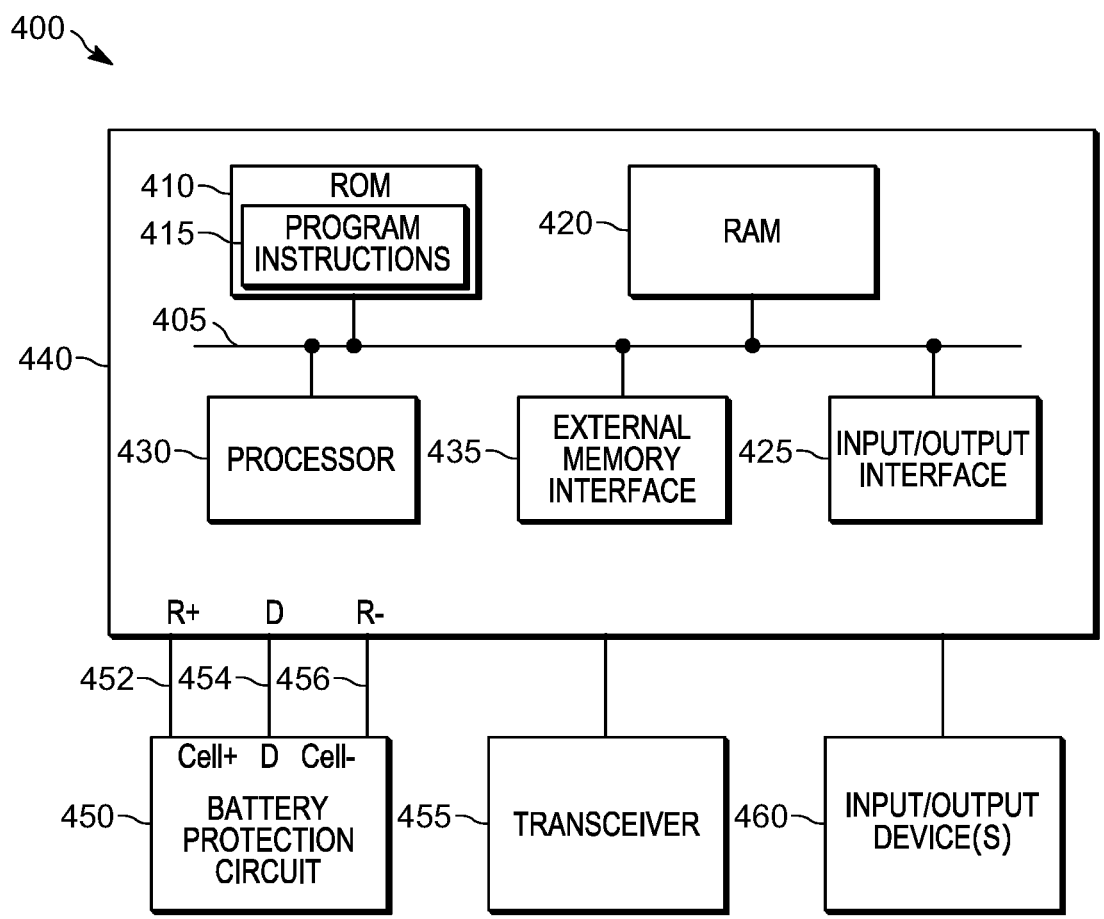
FIG. 4 is a block diagram illustrating selected elements of an example electronic device including a power source and a host processing unit, in accordance with some embodiments.

FIG. 4 is a block diagram illustrating an example electronic device 400 including a power source shown as battery protection circuit 450 and a host processing unit 440, in accordance with some embodiments. Electronic device 400 may be any type of electronic device for which power can be supplied, at least at certain times, by battery protection circuit 450. In some embodiments, electronic device 400 may be a portable electronic device such as a multifunction radio, a mobile telephone, a laptop computer, a tablet computer, a smart phone, a lighting system, a sound system, or another type of portable electronic device.

Battery protection circuit 450 may include circuitry or logic for extending discharge over-current trip time as described herein. In some embodiments, battery protection circuit 450 may be similar to battery protection circuit 100 illustrated in FIG. 1A or battery protection circuit 160 illustrated in FIG. 1B, and may provide power to host processing unit 440 over a load path defined collectively by the paths 452 and 456 between the terminals (Cell+ and Cell−) of a battery within battery protection circuit 450 and the terminals (R+ and R−) of host processing unit 440 as the load. Battery protection circuit 450 may also send data to or receive data from host processing unit 440 over one or more data lines 454, in some embodiments. In some embodiments, a digital signal indicating the measured value of the monitored discharge current signal, the voltage measured at the discharge over-current detection input of the primary safety circuit, or another current or voltage measurement taken within battery protection circuit 450 indicating that a discharge over-current or short circuit condition might cause the battery to be disabled in the near future, may be provided to processor 430 of host processing unit 440 over data lines 454. In response to receiving the digital signal, the processor 430 may begin taking actions to reduce the discharge current in an attempt to avoid the disabling of the battery or to reduce its impact. In some embodiments, host processing unit 440 may be operable to perform power management tasks. For example, host processing unit 440 may be operable to determine the amount of added delay to be applied to the assertion of a discharge over-current indicator output by a primary or secondary safety circuit within battery protection circuit 450 and to configure battery protection circuit 450 to apply the determined delay amount through software control of elements of the primary or secondary safety circuit within battery protection circuit 450 (not shown).

In some embodiments, other operating parameters of battery protection circuit 450 may be obtained or controlled by software operating on host processing unit 440. For example, host processing unit 440 may obtain one or more operating parameters of a battery within battery protection circuit 450 over data lines 454. In some embodiments, the operating parameters of the battery may be read from a memory within the battery or battery protection circuit 450 that stores battery data by host processing unit 440. The operating parameters of the battery obtained by host processing unit 440 may include, but are not limited to, the state-of-charge of the battery, its battery type, its battery topology, the available capacity of the battery, the peak charging capacity of the battery, the present charging capacity of the battery, a nominal voltage range for the battery, the temperature of the battery, an indication of the age of the battery, the number of charge-discharge cycles the battery has experienced, or a measure of impedance. In some embodiments, because the short circuit detection and control functions are separate from the discharge over-current detection and control functions in battery protection circuit 450, the host processing unit 440 may be able to obtain a count of the occurrence of short circuit type conditions and may take this information into consideration when determining actions to take to manage the supply of and demand for power in electronic device 400. For example, circuitry or logic within battery protection circuit 450 may detect each assertion of the control signal Do (116) or the control signal Do (152) and maintain a counter in a memory whose value reflects the number of such occurrences. A power management function operating on the host processing unit 440 may be able to read this value from the memory.

As illustrated in this example embodiment, host processing unit 440 may include a Read Only Memory (ROM) 410, a Random Access Memory (RAM) 420, an electronic processor 430, an input/output interface 425, and an external memory interface 435, all of which are coupled to a system bus 405 through which they communicate with each other. In various embodiments, electronic processor 430 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware elements of electronic device 400.

In this example embodiment, ROM 410 stores program instructions 415, at least some of which may be executed by electronic processor 430 to perform the methods described herein. For example, some of the operations of method 200 illustrated in FIG. 2 or method 300 illustrated in FIG. 3 may be performed by program instructions executing on host processing unit 440. In some embodiments, program instructions 415 may include program instructions that when executed on host processing unit 440 implement other functionality features of electronic device 400. In some embodiments, program instructions 415 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In this example embodiment, RAM 420 may, from time to time, store data representing battery data or operating parameters of a battery within battery protection circuit 450 to be used in extending discharge over-current trip time, as described herein, or performing other power management functions on behalf of electronic device 400. In some embodiments, RAM 420 may also store data used in performing other functions of the electronic device 400.

In this example embodiment, input/output interface 425 may include one or more analog input interfaces, such as one or more A/D convertors, or digital interfaces for receiving signals or data representing battery data or operating parameters of a battery within battery protection circuit 450. Input/output interface 425 may also include interfaces through which host processing unit 440 may be coupled to other elements of electronic device 400. For example, host processing unit 440 may be coupled to input/output devices that implement other functionality features of electronic device 400, such as a keyboard, a mouse, a touch panel, a switch, a microphone, a video camera, a display, a speaker, one or more sensors, and the like over input/output interface 425. In the illustrated example, host processing unit 440 is shown coupled to a transceiver 455 and one or more input/output devices 460.

External memory interface 435 may include one or more interfaces through which host processing unit 440 may be coupled to an external memory (not shown in FIG. 4). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Compared to some existing battery protection circuits, the methods and apparatus described herein for extending discharge over-current trip time may enable batteries to be better able to provide sufficient power to meet the increasing demands of portable electronic devices while meeting published requirements for LPS directed to discharge over-current and short circuit type conditions. By incorporating a delay circuit used in conjunction with an existing safety circuit, the battery protection circuits described herein may extend the discharge over-current trip time, allowing more time for electronic devices powered by the batteries to reduce functionality or take other actions to prevent the battery protection circuits from tripping and disabling the batteries they protect.

As described in detail herein, the separation of short circuit detection and control elements from discharge over-current detection and control elements provides significant technical advantages over existing battery protection architectures in which these functions are combined. For example, this hybrid battery protection architecture allows the battery protection circuit to apply different delay periods on different battery protection elements, resulting in increased discharge over-current trip time and increased trip energy without sacrificing performance in short circuit type conditions.

Figure 5:
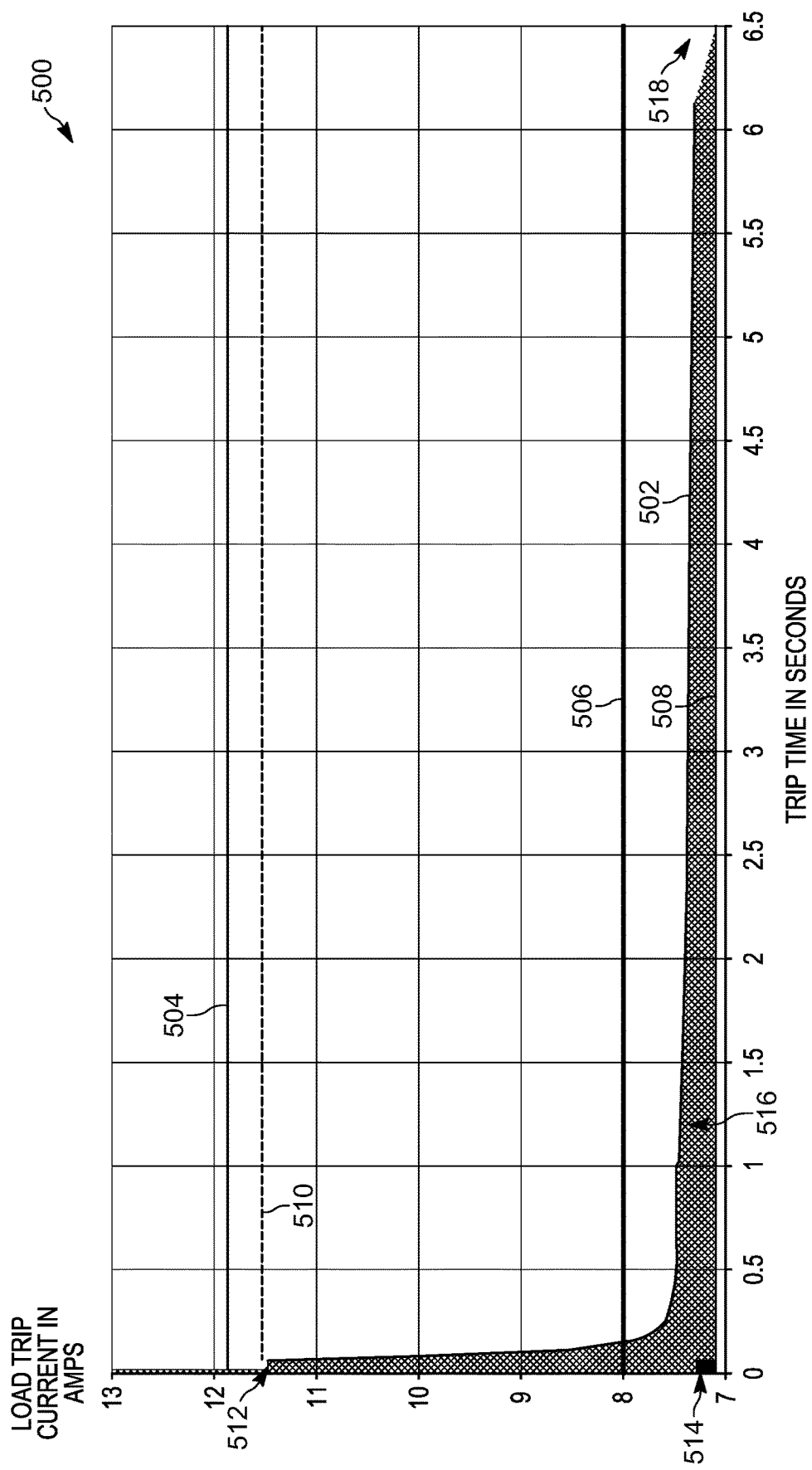
FIG. 5 is an illustration of a graph depicting a comparison of the performance of an existing battery protection circuit and the battery protection circuits for extending discharge over-current trip time described herein, in accordance with some embodiments.

FIG. 5 is an illustration of a graph 500 depicting a comparison of the performance of an existing battery protection circuit and the battery protection circuits for extending discharge over-current trip time described herein. Elements shown in graph 500 are used to illustrate relationships between load trip currents, measured in amps, and over-current trip time, measured in seconds, for different battery protection circuits. Curve 502 plots load trip currents and corresponding over-current trip times for a battery protection circuit that includes a delay circuit coupled to the over-current detection input of a primary or secondary safety circuit and a separate short circuit detection circuit for which no added delay is applied, such as battery protection circuits 100 and 160 illustrated in FIGS. 1A and 1B, respectively.

In graph 500, line 504 represents a peak output current limit of 11.9 amps defined by the specific battery cell requirements, line 506 represents the sustained over-current limit of 8 amps defined by the LPS requirements, and line 508 represents a battery hold current of 7.1 amps, above which a primary or secondary safety circuit may, following an added delay applied by the delay circuit, assert a discharge over-current indicator output to trip the battery protection circuit. In this example, line 510 represents a short circuit trip threshold of 11.5 amps, which is much greater than the LPS sustained over-current limit of 8 amps but is less than the cell-specific peak output current limit of 11.9 amps.

In FIG. 5, element 512 represents a fast spike that might be experienced in a short circuit condition. As shown in this example, when the current peaks well above the short circuit trip threshold of 11.5 amps, the battery protection circuit trips within 280 microseconds. Element 518 indicates that a current of 7.2 amps might take much longer than the 6.5 seconds depicted in FIG. 5 to trip the battery protection circuit. For example, in one embodiment, a current of 7.2 amps might not cause a battery protection circuit that includes a delay circuit coupled to the over-current detection input of a primary or secondary safety circuit and a separate short circuit detection circuit for which no added delay is applied to trip for as long as 18 seconds after the current reaches 7.2 amps.

The area of the small rectangle labeled as 514 in graph 500 represents the trip energy of an existing battery protection circuit that includes one or more safety circuits to which no delay circuit is coupled and that does not include a separate fast short circuit detection circuit. In this example, an over-current trip time of 64 milliseconds is experienced when the discharge current is 7.3 amps.

By contrast, the hashed area under curve 502, which is labeled as 516, represents the trip energy of a battery protection circuit including a primary or secondary safety circuit that includes a delay circuit coupled to its over-current detection input. Graph 500 illustrates that, in this case, the trip energy is much larger than for the existing battery protection circuit and that the battery protection circuit described herein can handle very large peak currents for much longer durations than can the existing battery protection circuit. Including the separate fast short circuit detection circuit in the battery protection circuit further extends the trip time, increasing the energy under the curve.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A protection circuit for a battery in an electronic device, comprising:
   a discharge over-current trip circuit configured to disable the battery responsive to assertion of a discharge over-current control signal;
   a primary safety circuit electrically connected to the battery and the discharge over-current trip circuit and configured to assert a first discharge over-current indicator output responsive to detecting that a discharge current of the battery exceeds a first discharge over-current threshold, the first discharge over-current threshold being less than a predefined maximum current for a sustained over-current condition;
   a primary delay circuit electrically connected to an over-current detection input of the primary safety circuit and configured to apply an added delay of a first delay amount to the assertion of the first discharge over-current indicator output;
   a primary short circuit detection circuit electrically connected to the battery and the discharge over-current trip circuit and configured to assert a second discharge over-current indicator output responsive to detecting that a discharge current of the battery exceeds a second discharge over-current threshold, wherein no added delay is applied to the assertion of the second discharge over-current indicator output; and
   a first logic circuit electrically connected to the first discharge over-current indicator output and the second discharge over-current indicator output, the first logic circuit configured to assert the discharge over-current control signal responsive to one of: assertion of the first discharge over-current indicator output and assertion of the second discharge over-current indicator output.

2. The protection circuit of claim 1, further comprising:
   a secondary safety circuit electrically connected to the battery and the discharge over-current trip circuit and configured to assert a third discharge over-current indicator output responsive to detecting that the discharge current of the battery exceeds the first discharge over-current threshold;
   a secondary delay circuit electrically connected to an over-current detection input of the secondary safety circuit and configured to apply an added delay of the first delay amount to the assertion of the third discharge over-current indicator output; and
   a second logic circuit electrically connected to the third discharge over-current indicator output and configured to assert the discharge over-current control signal responsive to assertion of the third discharge over-current indicator output.

3. The protection circuit of claim 2, further comprising:
a secondary short circuit detection circuit electrically connected to the battery and the discharge over-current trip circuit and configured to assert a fourth discharge over-current indicator output responsive to detecting that the discharge current of the battery exceeds the second discharge over-current threshold, wherein no added delay is applied to the assertion of the fourth discharge over-current indicator output; and
wherein the second logic circuit is electrically connected to the fourth discharge over-current indicator output and is further configured to assert the discharge over-current control signal responsive to assertion of the fourth discharge over-current indicator output.

4. The protection circuit of claim 1, wherein the second discharge over-current threshold is greater than a predefined maximum current for a sustained over-current condition and less than a predefined maximum current for a peak over-current condition.

5. The protection circuit of claim 1, wherein the first delay amount is dependent on the discharge current of the battery.

6. The protection circuit of claim 1, wherein the primary delay circuit comprises a resistorcapacitor (RC) circuit.

7. The protection circuit of claim 1, wherein the first delay amount is dependent on a software-generated delay control signal provided to the protection circuit.

8. The protection circuit of claim 1, wherein the first logic circuit is configured to implement a logical OR function whose inputs include the first discharge over-current indicator output and the second discharge over-current indicator output and whose output is the discharge over-current control signal.

9. A method of providing battery protection in an electronic device, comprising:
electrically connecting a safety circuit to a battery and to a discharge over-current trip circuit;
electrically connecting a delay circuit to an over-current detection input of the safety circuit;
electrically connecting a short circuit detection circuit to the battery and to the discharge over-current trip circuit;
asserting a discharge over-current control signal responsive to one of:
assertion of a first discharge over-current indicator output by the safety circuit in response to detecting that the discharge current of the battery exceeds a first discharge over-current threshold, the first discharge over-current threshold being less than a predefined maximum current for a sustained over-current condition, the assertion of the first discharge over-current indicator output being delayed by application of an added delay of a first delay amount by the delay circuit; and
assertion of a second discharge over-current indicator output by the short circuit detection circuit in response to detecting that the discharge current of the battery exceeds a second discharge over-current threshold, wherein no added delay is applied to the assertion of the second discharge over-current indicator output; and
disabling the battery responsive to the assertion of the discharge over-current control signal.

10. The method of claim 9, wherein the second discharge over-current threshold is greater than a predefined maximum current for a sustained over-current condition and less than a predefined maximum current for a peak over-current condition.

11. The method of claim 9, wherein the first delay amount is dependent on the discharge current of the battery.

12. The method of claim 9, wherein the first delay amount is dependent on a software-generated delay control signal provided to the delay circuit.

13. An electronic device, comprising:
a battery;
a discharge over-current trip circuit configured to disable the battery responsive to assertion of a discharge over-current control signal;
a primary safety circuit electrically connected to the battery and the discharge over-current trip circuit and configured to assert a first discharge over-current indicator output responsive to detecting that a discharge current of the battery exceeds a first discharge over-current threshold, the first discharge over-current threshold being less than a predefined maximum current for a sustained over-current condition;
a primary delay circuit electrically connected to an over-current detection input of the primary safety circuit and configured to apply an added delay of a first delay amount to the assertion of the first discharge over-current indicator output;
a primary short circuit detection circuit electrically connected to the battery and the discharge over-current trip circuit and configured to assert a second discharge over-current indicator output responsive to detecting that a discharge current of the battery exceeds a second discharge over-current threshold, wherein no added delay is applied to the assertion of the second discharge over-current indicator output; and
a first logic circuit electrically connected to the first discharge over-current indicator output and the second discharge over-current indicator output, the first logic circuit configured to assert the discharge over-current control signal responsive to one of: assertion of the first discharge over-current indicator output and assertion of the second discharge over-current indicator output.

14. The electronic device of claim 13, further comprising:
a secondary safety circuit electrically connected to the battery and the discharge over-current trip circuit and configured to assert a third discharge over-current indicator output responsive to detecting that the discharge current of the battery exceeds the first discharge over-current threshold;
a secondary delay circuit electrically connected to an over-current detection input of the secondary safety circuit and configured to apply an added delay of the first delay amount to the assertion of the third discharge over-current indicator output; and
a second logic circuit electrically connected to the third discharge over-current indicator output and configured to assert the discharge over-current control signal responsive to assertion of the third discharge over-current indicator output.

15. The electronic device of claim 13, wherein the second discharge over-current threshold is greater than a predefined maximum current for a sustained over-current condition and less than a predefined maximum current for a peak over-current condition.

16. The electronic device of claim 13, wherein the primary delay circuit comprises a resistor-capacitor (RC) circuit.

17. The electronic device of claim 13, wherein the first logic circuit is configured to implement a logical OR function whose inputs include the first discharge over-current indicator output and the second discharge over-current indicator output and whose output is the discharge over-current control signal.

* * * * *